United States Patent
Uchiyama et al.

(10) Patent No.: US 10,629,911 B2
(45) Date of Patent: Apr. 21, 2020

(54) ACTIVE MATERIAL COMPOSITE POWDER, LITHIUM BATTERY, AND METHOD FOR MANUFACTURING THE SAME

(71) Applicants: TOYOTA JIDOSHA KABUSHIKI KAISHA, Toyota-shi, Aichi (JP); DOWA HOLDINGS CO., LTD., Tokyo (JP)

(72) Inventors: Takayuki Uchiyama, Susono (JP); Nariaki Miki, Susono (JP); Yoshiaki Aiki, Akaiwa (JP); Koji Tanoue, Okayama (JP)

(73) Assignees: TOYOTA JIDOSHA KABUSHIKI KAISHA, Toyota-shi, Aichi-ken (JP); DOWA HOLDINGS CO., LTD., Chiyoda-ku, Tokyo (JP)

( * ) Notice: Subject to any disclaimer, the term of this patent is extended or adjusted under 35 U.S.C. 154(b) by 457 days.

(21) Appl. No.: 14/914,682

(22) PCT Filed: Jul. 18, 2014

(86) PCT No.: PCT/JP2014/069251
§ 371 (c)(1),
(2) Date: Feb. 26, 2016

(87) PCT Pub. No.: WO2015/037330
PCT Pub. Date: Mar. 19, 2015

(65) Prior Publication Data
US 2016/0211519 A1    Jul. 21, 2016

(30) Foreign Application Priority Data
Sep. 12, 2013    (JP) ................. 2013-189489

(51) Int. Cl.
*H01M 4/04*    (2006.01)
*H01M 4/131*    (2010.01)
(Continued)

(52) U.S. Cl.
CPC .............. *H01M 4/62* (2013.01); *C01G 53/50* (2013.01); *H01M 4/0404* (2013.01);
(Continued)

(58) Field of Classification Search
CPC .................................................... H01M 4/0419
See application file for complete search history.

(56) References Cited

U.S. PATENT DOCUMENTS

2003/0082448 A1    5/2003    Cho et al.
2004/0200998 A1*  10/2004   Park .................. C01G 51/42
                                                  252/500
(Continued)

FOREIGN PATENT DOCUMENTS

CN    102139930 A    8/2011
CN    103124695 A    5/2013
(Continued)

OTHER PUBLICATIONS

Deepa Dey et al., "Peroxide Route Towards Low Temperature Synthesis of $LiNbO_3$: An Environmentally Benign Approach", Journal of the Ceramic Society of Japan, 2004, pp. 368-372, vol. 112, No. 7.
(Continued)

*Primary Examiner* — Stephan J Essex
(74) *Attorney, Agent, or Firm* — Sughrue Mion, PLLC

(57) ABSTRACT

Provided is an active material composite powder with which resistance can be reduced, and a method for manufacturing the active material composite powder. The active material composite powder includes an active material and lithium niobate attached onto the surface of the active material, and its BET specific surface area S $[m^2/g]$ is $0.93<S<1.44$, and the method for manufacturing an active material composite powder includes a spraying and drying step of spraying a solution including lithium and a peroxo complex of niobium
(Continued)

onto the active material and at the same time drying the solution, and a heating treatment step of carrying out a heating treatment after the spraying and drying step, wherein the temperature of the heating treatment is higher than 123° C. and lower than 350° C.

2 Claims, 9 Drawing Sheets

(51) Int. Cl.

| | |
|---|---|
| H01M 4/1391 | (2010.01) |
| H01M 10/0525 | (2010.01) |
| H01M 10/0562 | (2010.01) |
| H01M 4/62 | (2006.01) |
| H01M 4/505 | (2010.01) |
| H01M 4/525 | (2010.01) |
| H01M 4/36 | (2006.01) |
| H01M 4/485 | (2010.01) |
| C01G 53/00 | (2006.01) |
| H01M 4/139 | (2010.01) |
| H01M 10/052 | (2010.01) |
| H01M 4/02 | (2006.01) |

(52) U.S. Cl.
CPC ....... *H01M 4/0419* (2013.01); *H01M 4/0471* (2013.01); *H01M 4/1391* (2013.01); *H01M 4/366* (2013.01); *H01M 4/485* (2013.01); *H01M 4/505* (2013.01); *H01M 4/525* (2013.01); *H01M 10/0525* (2013.01); *H01M 10/0562* (2013.01); *C01P 2006/12* (2013.01); *C01P 2006/40* (2013.01); *H01M 4/131* (2013.01); *H01M 4/139* (2013.01); *H01M 10/052* (2013.01); *H01M 2004/028* (2013.01)

(56) References Cited

U.S. PATENT DOCUMENTS

| | | |
|---|---|---|
| 2009/0081554 A1 | 3/2009 | Takada et al. |
| 2009/0280412 A1 | 11/2009 | Imanari et al. |
| 2010/0068523 A1 | 3/2010 | Williams et al. |
| 2010/0209771 A1 | 8/2010 | Shizuka et al. |
| 2011/0027661 A1 | 2/2011 | Okazaki et al. |
| 2013/0209890 A1 | 8/2013 | Nagatomi |
| 2014/0204445 A1 | 7/2014 | Choi et al. |
| 2014/0227606 A1 | 8/2014 | Suzuki et al. |
| 2014/0353547 A1 | 12/2014 | Mitsumoto et al. |
| 2015/0311511 A1 | 10/2015 | Okato et al. |
| 2015/0333307 A1 | 11/2015 | Thokchom et al. |

FOREIGN PATENT DOCUMENTS

| | | | |
|---|---|---|---|
| CN | 104310479 A | 1/2015 | |
| JP | H06-111822 A | 4/1994 | |
| JP | 2009-76402 A | 4/2009 | |
| JP | 2010-129190 A | 6/2010 | |
| JP | 2011-65887 A | 3/2011 | |
| JP | 2012-74240 A | 4/2012 | |
| JP | 2012-156046 A | 8/2012 | |
| JP | 2014-049310 A | 3/2014 | |
| JP | 2014-93156 A | 5/2014 | |
| JP | 2014-238957 A | 12/2014 | |
| JP | 2015-056307 A | 3/2015 | |
| JP | 2015-513768 A | 5/2015 | |
| WO | 2007/004590 A1 | 1/2007 | |
| WO | WO-2012043321 A1 * | 4/2012 | ............ C01G 33/00 |
| WO | 2014/080719 A1 | 5/2014 | |

OTHER PUBLICATIONS

"Lithium Niobate Crystal Series (LiNbO$_3$, MgO:LiNbO$_3$)", Laser Components, 2001, (total 3 pages).

Office Action dated Aug. 30, 2017 from U.S. Patent & Trademark Office in U.S. Appl. No. 15/261,110.

Office Action dated Dec. 6, 2017 from U.S. Patent & Trademark Office in U.S. Appl. No. 15/261,110.

Office Action dated Mar. 22, 2018 from U.S. Patent & Trademark Office in U.S. Appl. No. 15/261,110.

Office Action dated Jul. 30, 2018 from U.S. Patent & Trademark Office in U.S. Appl. No. 15/261,110.

Office Action dated Apr. 4, 2019, which issued during the prosecution of U.S. Appl. No. 15/261,110.

Office Action dated Sep. 17, 2019, from U.S. Patent & Trademark Office in U.S. Appl. No. 15/261,110.

Office Action dated Jan. 30. 2020, from U.S. Patent & Trademark Office in U.S. Appl. No. 15/261,110 (13 pages).

* cited by examiner

ACTIVE MATERIAL COMPOSITE POWDER, LITHIUM BATTERY, AND METHOD FOR MANUFACTURING THE SAME

CROSS REFERENCE TO RELATED APPLICTIONS

This application is a National Stage of International Application No. PCT/JP2014/069251filed Jul. 18, 2014, claiming priority based on Japanese Patent Application No. 2013-189489filed Sep. 12, 2013, the contents of all of which are incorporated herein by reference in their entirety.

TECHNICAL FIELD

The present invention relates to: an active material composite powder including an active material and lithium niobate attached onto at least apart of the surface of the active material; a lithium battery having the active material composite powder; and methods for manufacturing the same.

BACKGROUND ART

Metal ion secondary batteries having solid electrolyte layers formed from flame-retardant solid electrolytes (e.g. lithium ion secondary battery, hereinafter it may be referred to as "all-solid-state battery") have advantages such as they can easily simplify the system for securing safety.

As a technique related to such an all-solid-state battery, for example Patent Literature 1 discloses a technique of forming a $LiNbO_3$ coating layer on the surface of a $LiCoO_2$ powder, through a process of hydrolyzing an alkoxide solution including lithium and niobium on the surface of the $LiCoO_2$ powder particle. Patent Literature 2 discloses a lithium-transition metal oxide powder consisting of a lithium-transition metal oxide particle at least apart of whose surface is covered by a coating layer including lithium niobate, whose carbon content is no more than 0.03 mass %. Non-Patent Literature 1 discloses a technique relating to a low temperature synthesis of lithium niobate with a peroxide route.

CITATION LIST

Patent Literature

Patent Literature 1: WO 2007/004590
Patent Literature 2: JP 2012-74240 A

Non-Patent Literature

Non-Patent Literature 1: Journal of the Ceramic Society of Japan, Vol. 112, No. 1307, pp. 368-372

SUMMARY OF INVENTION

Technical Problem

In the technique disclosed in Patent Literature 1, a $LiNbO_3$ coating layer is formed on the surface of a cathode active material. Thus it is possible to interpose a lithium ion conductive oxide layer between interfaces of the sulfide-based solid electrolyte and the cathode active material, and as a result, an improvement in the output performance of the all-solid-battery can be expected. However, the $LiNbO_3$ layer formed with the alkoxide solution has a lot of air gaps, and the gaps obstruct the movement of lithium ions. That is, in the technique disclosed in Patent Literature 1, the resistance of the all-solid-state battery easily increases since the lithium ion conductivity of the $LiNbO_3$ coating layer is small, and as a result, the output performance of the all-solid-state battery is difficult to improve. This problem is difficult to be solved by simply combining the technique disclosed in Patent Literature 1 and the technique disclosed in Patent Document 2 or Non-Patent Literature 1.

An object of the present invention is to provide: an active material composite powder which can reduce the reaction resistance of a battery; a lithium battery having the active material composite powder; and a method for manufacturing the active material composite powder and a method for manufacturing the lithium battery.

Solution to Problem

As a result of intensive researches, the inventors of the present invention found that it is possible to reduce the reaction resistance of a lithium battery by using an active material composite powder including an active material and lithium niobate attached onto the surface of the active material, the powder whose BET specific surface area is in a predetermined range. As a result of intensive researches, the inventors of the present invention also found that it is possible to obtain an active material composite powder which can reduce the reaction resistance of a lithium battery, by making the active material composite powder by: spraying a solution including lithium and a peroxo complex of niobium onto the surface of the active material; and at the same time, drying the solution. The present invention has been made based on the above findings.

In order to solve the above problem, the present invention takes the following structure. That is, a first aspect of the present invention is an active material composite powder including an active material; and lithium niobate attached onto a surface of the active material, wherein a BET specific surface area S [$m^2/g$] of the composite particle is more than 0.93 and less than 1.44.

By making the BET specific surface area of the active material composite powder more than 0.93 $m^2/g$ and less than 1.44 $m^2/g$, it is possible to reduce the reaction resistance of a lithium battery having the active material composite powder. It is noted that the value of the BET specific surface area in the present invention is a value rounded off to two decimal places, unless otherwise mentioned.

In the first aspect of the present invention, it is preferable that the BET specific surface are S is no less than 0.97 [$m^2/g$]. This makes it possible to easily reduce the reaction resistance of a lithium battery made with the active material composite powder.

In the first aspect of the present invention, it is preferable that the BET specific surface are S is no more than 1.34 [$m^2/g$]. This makes it possible to easily reduce the reaction resistance of a lithium battery made with the active material composite powder.

In the first aspect of the present invention, it is preferable that the mass ratio M1/M0 of the active material composite powder is 99.60<100×M1/M0, wherein M1 is a mass of the active material composite powder after a heating treatment of keeping the active material composite powder at 350° C. for 10 minutes in the atmosphere is carried out, and M0 is a mass of the active material composite powder before the heating treatment. This makes it possible to reduce the remaining amount of impurities which obstruct lithium ion conduction, such as hydrated water, therefore it is possible to easily reduce the reaction resistance of a lithium battery made with the active material composite powder. It is noted that, unless otherwise mentioned, the value of the mass ratio 100×M1/M0 in the present invention is a value rounded off to two decimal places.

A second aspect of the present invention is a lithium battery including a cathode, an anode, and an electrolyte having contact with the cathode and the anode, wherein at least either one of the cathode and the anode includes the active material composite powder according to the above first aspect of the present invention.

The active material composite powder according to the first aspect of the present invention can reduce the reaction resistance of a lithium battery. Therefore, it is possible to obtain a lithium battery whose reaction resistance is reduced, by including the active material composite powder in the cathode or the anode of the lithium battery, or, the cathode and the anode of the lithium battery.

A third aspect of the present invention is a method for manufacturing an active material composite powder including: a spraying and drying step of spraying a solution including lithium and a peroxo complex of niobium onto an active material and at the same time drying the solution; and a heating treatment step of carrying out a heating treatment after the spraying and drying step, wherein the temperature of the heating treatment is higher than 123° C. and lower than 350° C.

By using a solution including a peroxo complex, it is possible to reduce the amount of gas produced in the heating treatment. As a result, air gaps in the lithium niobate which obstruct lithium ion conduction get difficult to be made. Further, with the spraying and drying, the active material gets difficult to be eroded from the solution. Thus it gets easy to increase the lithium ion conductivity. In addition, by making the temperature of the heating treatment higher than 123° C., it is possible to reduce the remaining amount of impurities obstructing lithium ion conduction such as hydrated water. Thus it gets easy to increase the lithium ion conductivity. Furthermore, by making the temperature of the heating treatment lower than 350° C., it is possible to prevent the crystallization of lithium niobate. Uncrystallized lithium niobate has a higher lithium ion conductivity than that of crystallized lithium niobate. Therefore, by preventing the crystallization of lithium niobate, it gets easy to increase the lithium ion conductivity. Thus, with such a configuration, it is possible to manufacture an active material composite powder which can reduce the reaction resistance of a lithium battery.

A fourth aspect of the present invention is a method for manufacturing a lithium battery including a cathode, an anode, and an electrolyte having contact with the cathode and the anode, the method including: a spraying and drying step of spraying a solution including lithium and a peroxo complex of niobium onto an active material and at the same time drying the solution; a heating treatment step of carrying out a heating treatment at a temperature higher than 123° C. and lower than 350° C., to make an active material composite powder after the spraying and drying; and an electrode making step of making the cathode or the anode both including the active material composite powder.

By using a solution including a peroxo complex, it is possible to reduce the amount of gas produced in the heating treatment. As a result, air gaps in the lithium niobate which obstruct lithium ion conduction get difficult to be made. Further, with the spraying and drying, the active material gets difficult to be eroded from the solution. Thus it gets easy to increase the lithium ion conductivity. In addition, by making the temperature of the heating treatment more than 123° C., it is possible to reduce the remaining amount of impurities obstructing lithium ion conduction such as hydrated water. Thus it gets easy to increase the lithium ion conductivity. Furthermore, by making the temperature of the heating treatment lower than 350° C., it is possible to prevent the crystallization of lithium niobate. Uncrystallized lithium niobate has a higher lithium ion conductivity than that of crystallized lithium niobate. Therefore, by preventing the crystallization of lithium niobate, it gets easy to increase the lithium ion conductivity. Thus, with such a configuration, it is possible to manufacture an active material composite powder which can reduce the reaction resistance of a lithium battery. By making a cathode or an anode both including the active material composite powder, it is possible to make a cathode or an anode which can reduce the reaction resistance. Therefore, by having such a configuration, it is possible to manufacture a lithium battery whose reaction resistance can be reduced.

Advantageous Effects of Invention

According to the present invention, it is possible to provide an active material composite powder which can reduce the reaction resistance of a battery, a lithium battery having the active material composite powder, and a method for manufacturing the active material composite powder and a method for manufacturing the lithium battery.

DESCRIPTION OF EMBODIMENTS

Hereinafter the present invention will be described with reference to the drawings. The embodiments shown below are examples of the present invention and the present invention is not limited to the embodiments shown below.

1. Active Material Composite Powder

Figure 1:
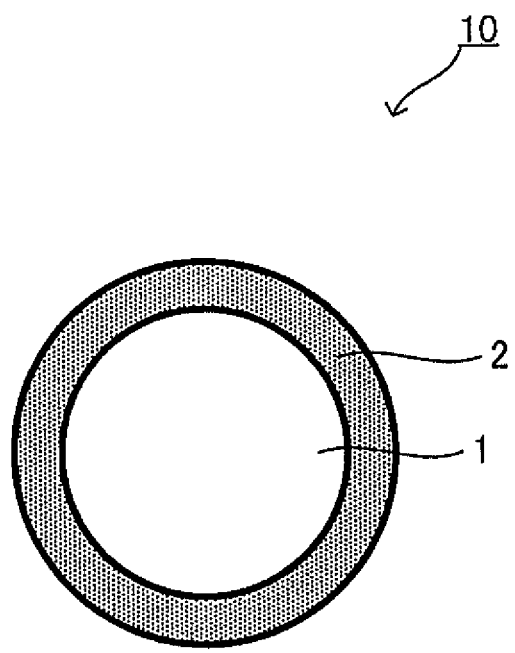
FIG. 1 is a view to explain an active material composite powder 10 of the present invention.

FIG. 1 is a view to explain an active material composite powder of the present invention. In FIG. 1, one active material composite powder 10 is extracted, and this active material composite powder 10 is shown simplified. For convenience, FIG. 1 shows an embodiment in which a lithium niobate 2 is attached onto (covering) the surface of one active material 1. However, the active material composite powder of the present invention is not limited to this embodiment. The active material composite powder of the present invention may be in a state where lithium niobate is attached onto (covering) the surface of an active material which is a secondary particle of gathered active materials.

As shown in FIG. 1, the active material composite powder 10 includes the active material 1 and lithium niobate 2 attached onto the surface of the active material 1. The BET specific surface area S of the active material composite powder 10 is 0.93 m$^2$/g<S<1.44 m$^2$/g.

The active material composite powder 10 is manufactured though a process of: attaching a precursor of lithium niobate onto the surface of the active material 1; thereafter carrying out a heating treatment thereon. If the temperature of the heating treatment is lower than a predetermined temperature, an active material composite powder in which impurities such as hydrated water and the like remain is easily manufactured after the heating treatment. The value of the BET specific surface area of such an active material composite powder is small. The remained impurities such as hydrated water and the like obstruct lithium ion conduction, therefore an all-solid-state battery using an active material composite particle in which impurities remain easily increase its reaction resistance. Therefore, in the present invention, in order to reduce the reaction resistance, the value of the BET specific surface area is made larger than a predetermined value. From such a viewpoint, the BET specific surface area S of the active material composite powder 10 is made larger than 0.93 m$^2$/g.

On the other hand, if the temperature of the heating treatment in manufacturing the active material composite powder 10 is same as or higher than a predetermined temperature, many gaps are easily formed in the lithium niobate attached onto the surface of the active material. The lithium niobate having many gaps has a low lithium ion conductivity. Therefore, an all-solid-state battery using an active material composite particle having such a lithium niobate easily increases its reaction resistance. Thus, in the present invention, in order to reduce the reaction resistance, the value of the BET specific surface area is made smaller than a predetermined value. Form such a view point, the BET specific surface area S of the active material composite powder 10 is made less than 1.44 m$^2$/g.

In the present invention, in view of making an active material composite powder whose reaction resistance is easily reduced, the BET specific surface area S is preferably no less than 0.97 m$^2$/g. By making the BET specific surface area S no less than 0.97 m$^2$/g, it gets easy to reduce the remaining amount of impurities such as hydrated water and the like, whereby it gets easy to reduce the reaction resistance.

In addition, in the present invention, in view of making an active material composite powder whose reaction resistance is easily reduced, the BET specific surface area S is preferably no more than 1.34 m$^2$/g. By making the BET specific surface area S no more than 1.34 m$^2$/g, lithium niobate whose amount of gaps are reduced is easily formed on the surface of the active material, therefore it gets easy to reduce the reaction resistance.

In addition, in the present invention, in view of making an active material composite powder whose reaction resistance is easily reduced, the lithium niobate to be attached onto the active material is preferably not crystallized. The lithium niobate provided to the active material composite powder whose BET specific surface area S is no more than 1.34 m$^2$/g is considered not to be crystallized. Therefore, by making the BET specific surface area S no more than 1.34 m$^2$/g, it gets easy to reduce the reaction resistance.

In addition, in the present invention, it is preferable that the mass ratio M1/M0 is 99.60<100×M1/M0, wherein M1 is a mass of the active material composite powder after a heating treatment of keeping the active material composite powder at 350° C. for 10 minutes in the atmosphere is carried out, and M0 is a mass of the active material composite powder after the heating treatment, in view of having an active material composite powder whose reaction resistance is easily reduced by reducing the remaining amount of impurities such as hydrated water. In view of having an active material composite powder whose reaction resistance is further easily reduced, it is preferable that the mass ratio M1/M0 is 99.89≤100×M1/M0.

In the present invention, the active material 1 is not particularly limited as long as it is a material which can be used as a raw material of an electrode active material of lithium ion secondary batteries. Examples of such a material include $LiCoO_2$, $LiNi_xCo_{1-x}O_2$ (0<x<1), $LiNi_{1/3}Co_{1/3}Mn_{1/3}O_2$, $LiMnO_2$, different kind element substituent Li—Mn spinels ($LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, $LiMn_{1.5}Zn_{0.5}O_4$), lithium titanates (e.g. $Li_4Ti_5O_{12}$), lithium metal phosphates ($LiFePO_4$, $LiMnPO_4$, $LiCoPO_4$, $LiNiPO_4$), transition metal oxides ($V_2O_5$, $MoO_3$), $TiS_2$, carbon materials such as graphite and hard carbon, LiCoN, $SiO_2$, $Li_2SiO_3$, $Li_4SiO_4$, lithium metal (Li), lithium alloys (LiSn, LiSi, LiAl, LiGe, LiSb, LiP), lithium storage intermetallic compounds (e.g. $Mg_2Sn$, $Mg_2Ge$, $Mg_2Sb$, $Cu_3Sb$) and the like. Here, for an all-solid-state battery having the active material composite powder of the present invention, two materials, each having a different electric potential (charge-discharge potential) at which lithium ions are absorbed/released from each other, may be selected from the above materials described as examples. From the two materials, the material showing a nobler potential may be used as a cathode active material, and the material showing a baser potential may be used as an anode active material. This makes it possible to form all-solid-state batteries having any voltages.

In addition, the configuration of the lithium niobate 2 is not particularly limited. However, in view of having a configuration with which the reaction resistance is easily reduced, preferably the remaining amount of impurities such as hydrated water is small, preferably the lithium niobate 2 is amorphous, and preferably the number of gaps is small. A lithium niobate having such a configuration may be formed for example by a method described later in the section of a method for manufacturing an active material composite powder, or the like.

2. Lithium Battery

Figure 2:
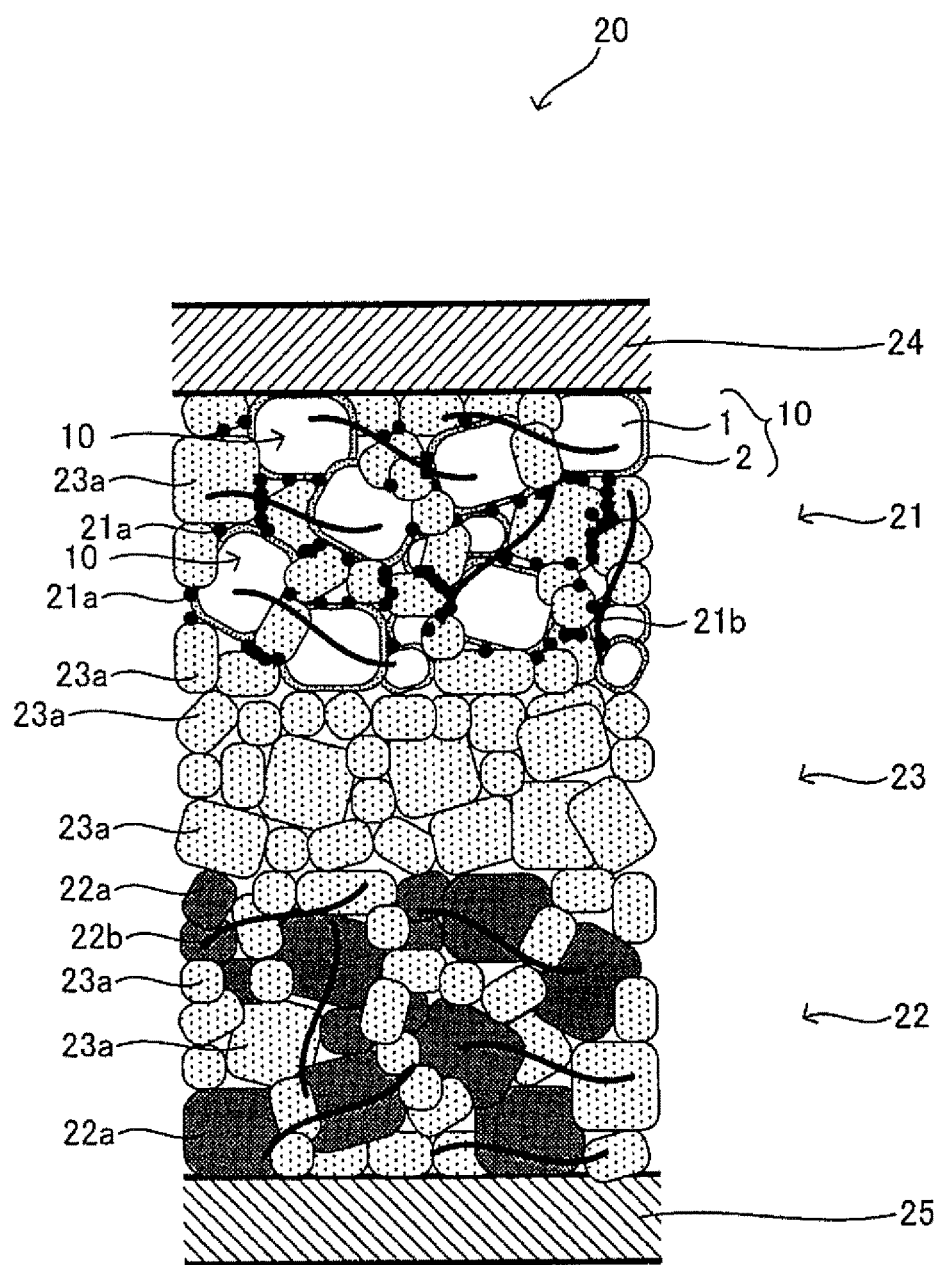
FIG. 2 is a view to explain a lithium battery 20 of the present invention.

FIG. 2 is a view to explain a lithium battery 20 (lithium ion secondary battery 20) of the present invention. In FIG. 2, the lithium battery 20 is shown being simplified, and descriptions of the exterior body and the like are omitted. In FIG. 2, in the same way as in the active material composite powder 10 shown in FIG. 1, to the substances including the active material and lithium niobate attached onto the surface of the active material, whose BET specific surface area S is 0.93 m$^2$/g<S<1.44 m$^2$/g, same symbol 10 is given, and descriptions thereof are adequately omitted.

As shown in FIG. 2, the lithium battery 20 includes a cathode 21, an anode 22, a solid electrolyte layer 23 arranged between the cathode 21 and the anode 22, a cathode current collector 24 connected to the cathode 21, and an anode current collector 25 connected to the anode 22. The cathode 21 includes the active material composite powder 10 of the present invention, a sulfide solid electrolyte 23a, a conductive assistant 21a, and a binder 21b. The active material composite powder 10 includes the active material 1 (hereinafter it may be referred to as "cathode active material 1") and the lithium niobate 2 attached onto the surface of the cathode active material 1. The anode 22 includes an anode active material 22a, a sulfide solid electrolyte 23a, and a binder 22b. The solid electrolyte layer 23 includes a sulfide solid electrolyte 23a. In the lithium battery 20, the cathode active material 1 is $LiNi_{1/3}CO_{1/3}Mn_{1/3}O_2$, and the anode active material 22a is graphite.

In this way, the lithium battery 20 includes the cathode 21 including the active material composite powder 10 of the present invention. As described above, the active material composite powder 10 of the present invention can reduce the reaction resistance. Thus by having the cathode 21 including the active material composite powder 10, it is possible to provide the lithium battery 20 whose reaction resistance can be reduced.

Here, the cathode 21 may be manufactured for example through processes of: adding the active material composite powder 10, the sulfide solid electrolyte 23a, the conductive assistance 21a, and the binder 21b, in a solvent; thereafter dispersing the resultant material by an ultrasonic homogenizer and the like, to make a cathode composition in a slurry form; applying the cathode composition onto the surface of the cathode current collector 24; thereafter drying it. The anode 22 may be manufactured for example through processes of: adding the anode active material 22a, the sulfide solid electrolyte 23a, and the binder 22b, in a solvent; thereafter dispersing the resultant material by an ultrasonic homogenizer and the like, to make an anode composition in a slurry form; applying the anode composition onto the surface of the anode current collector 25; thereafter drying it. The solid electrolyte layer 23 may be manufactured for example through a process of pressing the sulfide solid electrolyte 23a or the like. After the cathode 21, the anode 22, and the solid electrolyte layer 23 are manufactured in this way, the anode current collector 25, the anode 22, the solid electrolyte layer 23, the cathode 21, and the cathode current collector 24 are laminated so as to be arranged in the order mentioned from one side to the other, for example in an inert atmosphere (e.g. argon atmosphere, nitrogen atmosphere, helium atmosphere, and the like), to form a layered body, as shown in FIG. 2. Thereafter, by having processes such as pressing of the laminated body, the lithium battery 20 can be manufactured.

In the lithium battery of the present invention, for the cathode active material and the anode active material, two substances, each having a different electric potential (charge/discharge potential) at which lithium ions are absorbed/released, may be selected from the substances described as the specific example of the active material 1 relating to "1. Active material composite powder", so as to form the lithium battery 20 having an aimed voltage. From the two substances, the substance showing a nobler potential may be used as the cathode active material, and the material showing a baser potential may be used as the anode active material.

The shape of the cathode active material may be a particle or a thin film, for example. The average particle size ($D_{50}$) of the cathode active material is, for example, preferably no less than 1 nm and no more than 100 μm, and more preferably no less than 10 nm and no more than 30 μm. The content of the cathode active material in the cathode is, though not particularly limited, for example preferably no less than 40% and no more than 99% by mass.

As described above, the lithium battery of the present invention may include a known solid electrolyte which can be used for a lithium battery, in the cathode and the anode as well, as needed. Examples of the solid electrolyte which can be included in the cathode and the anode include $Li_2S$—$SiS_2$, $LiI$—$Li_2S$—$SiS_2$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$, and the like. The method for manufacturing the solid electrolyte which can be used for the lithium battery of the present invention is not particularly limited, and a solid electrolyte manufactured by a known manufacturing method may be adequately employed. The solid electrolyte may be amorphous or crystalline.

In addition, for the cathode, a known binder which can be included in a cathode of a lithium battery may be used. Examples of such a binder include acrylonitrile butadiene rubber (ABR), butadiene rubber (BR), polyvinylidene fluoride (PVdF), styrene-butadiene rubber (SBR) and the like. Further, the cathode may include a conductive assistant for improving the conductivity. Examples of the conductive assistant which can be included in the cathode include carbon materials such as vapor-grown carbon fiber, acetylene black (AB), Ketjen black (KB), carbon nanotube (CNT), and carbon nanofiber (CNF), and metal materials which can endure the environment when a lithium battery is used. In a case where the cathode is manufactured with a cathode composition in a slurry form adjusted by a dispersion of the cathode active material, the solid electrolyte, the conductive assistant, the binder and the like in a liquid, heptane and the like may be given as examples of the liquid which can be used, and a non-polar solvent may be preferably used. The thickness of the cathode is, for example, preferably no less than 0.1 μm and no more than 1 mm, and more preferably no less than 1 μm and no more than 100 μm. The cathode may be manufactured through a process of pressing. The pressure in pressing the cathode may be around 100 MPa in the present invention.

The shape of the anode active material to be included in the anode may be a particle, a thin film or the like for example. The average particle size ($D_{50}$) of the anode active material is, for example, preferably no less than 1 nm and no more than 100 μm, and more preferably no less than 10 nm and no more than 30 μm. The content of the anode active material in the anode is, though not particularly limited, for example preferably no less than 40% and no more than 99% by mass.

In addition to the anode active material and the solid electrolyte, a binder for bonding the anode active material and the solid electrolyte may be used for the anode, as needed. As the binder, the above-described binders which can be included in the cathode may be given as examples. Further, the anode may include a conductive assistant for improving electrical conductivity. As the conductive assistant which can be included in the anode, the above-described conductive assistants which can be included in the cathode may be given as examples. In addition, for example in a case where the anode is manufactured with an anode composition in a slurry form adjusted by a dispersion of the anode active material, the solid electrolyte, the conductive assistant, the binder and the like in a liquid, heptane and the like can be given as examples of the liquid which can be used, and a non-polar solvent may be preferably used. The thickness of the anode is, for example, preferably no less than 0.1 μm and no more than 1 mm, and more preferably no less than 1 μm and no more than 100 μm. The anode can be manufactured through a process of pressing. In the present invention, the pressure in pressing the anode is preferably no less than 200 MPa, and more preferably around 400 MPa.

As the solid electrolyte to be included in the solid electrolyte layer, a known solid electrolyte which can be used for all-solid-state batteries may be adequately used. As the solid electrolyte, the above-described solid electrolytes and the like which can be included in the cathode and the anode may be given as examples. In addition to this, the solid electrolyte layer may include a binder for bonding the solid electrolytes to each other, in view of developing plasticity and the like. As the binder, the above-described binders which can be included in the cathode may be given as examples. It is noted that, the content of the binder to be included in the solid electrolyte layer is preferably no more than 5% by mass, in view of making it possible to form a solid electrolyte layer having the solid electrolyte not excessively aggregated but uniformly dispersed, in order to easily obtain a high output power. In a case where the solid electrolyte layer is manufactured through a process of applying to the base material the solid electrolyte composition in a slurry form adjusted by a dispersion of the solid electrolyte and the like in a liquid, heptane and the like may be given as examples of the liquid to disperse the solid electrolyte and the like, and a non-polar solvent may be preferably used. The content of the solid electrolyte material in the solid electrolyte layer is, for example, preferably no less than 60%, more preferably no less than 70%, and especially preferably no less than 80%, by mass. The thickness of the solid electrolyte layer is, though widely different depending on the structure of a battery, for example preferably no less than 0.1 μm and no more than 1 mm, and more preferably no less than 1 μm and no more than 100 μm.

For the anode current collector and cathode current collector, a known metal which can be used as current collectors of lithium batteries may be used. Examples of such a metal include a metal material including one or at least two elements selected from the group consisting of Cu, Ni, Al, V, Au, Pt, Mg, Fe, Ti, Co, Cr, Zn, Ge, and In.

Though the illustration in the drawings is omitted, the lithium battery of the present invention may be used being accommodated in a known exterior body which can be used for lithium batteries. Examples of such an exterior body include a known laminate film, a metal housing and the like.

3. Method for Manufacturing Active Material Composite Powder

Figure 3:
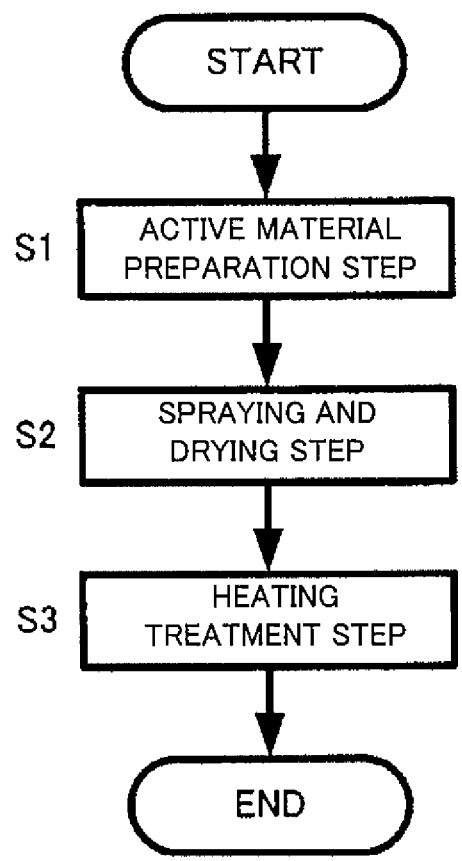
FIG. 3 is a flowchart to explain a method for manufacturing an active material composite powder of the present invention.

FIG. 3 is a view to explain a method for manufacturing an active material composite powder of the present invention. The method for manufacturing an active material composite powder of the present invention shown in FIG. 3 includes an active material preparation step (S1), a spraying and drying step (S2), and a heating treatment step (S3).

The active material preparation step (hereinafter it may be referred to as "S1") is a step of preparing an active material of which lithium niobate is to be attached onto its surface in the step described later. S1 is not particularly limited as long as the active material can be prepared. S1 may be a step of preparing the active material by manufacturing the active material, or may be a step of preparing the active material by purchasing the active material.

Figure 4:
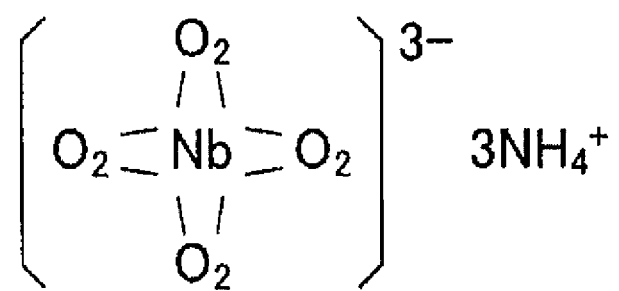
FIG. 4 is a view to explain a peroxo complex of niobium.

The spraying and drying step (hereinafter it may be referred to as "S2") is a step of spraying a solution including lithium and a peroxo complex of niobium onto the active material prepared in S1, and at the same time, drying the solution sprayed onto the active material. FIG. 4 shows the structural formula of the peroxo complex of niobium. As the solution to be sprayed onto the active material in S2, an aqueous solution obtained by: making a transparent solution from hydrogen peroxide water, niobium acid, and ammonia water; thereafter adding a lithium salt to the resultant transparent solution (hereinafter the aqueous solution may be referred to as "complex solution"), and the like may be given for example. The water containing ratio of niobium acid used in S2 is not particularly limited, since the peroxo complex of niobium can be synthesized even though the water containing ratio of niobium acid is changed. The mixing ratio of the niobium acid and the ammonia water is not particularly limited as long as the peroxo complex of niobium can be synthesized. As the lithium salt which can be used in S2, LiOH, LiNO$_3$, Li$_2$SO$_4$, and the like can be given for example.

By the spraying in S2, the complex solution including a niobium compound and a lithium compound is attached onto the surface of the active material. By the drying in S2, the volatile elements included in the complex solution attached onto the surface of the active material, such as the solvent and hydrated water, are removed. Hereinafter, the configuration of the substance after the complex solution is dried may be referred to as "precursor of lithium niobate".

In S2, the complex solution is sprayed onto the active material, and at the same time, the complex solution sprayed and attached onto the surface of the active material is dried. S2 may be carried out, for example, by means of a tumbling fluidized coating machine, a spray dryer, and the like. As the tumbling fluidized coating machine, Multiplex manufactured by POWREX CORPORATION, Flow coater manufactured by FREUND CORPORATION and the like may be given for example. When one active material is focused on in a case where a tumbling fluidized coating machine is used in S2, the complex solution is dried immediately after sprayed onto the active material, and the spraying of the complex solution onto the active material and the drying of the complex solution sprayed onto the active material are repeated, until the thickness of the layer of the precursor of lithium niobate attached onto the surface of the active material has an aimed thickness. When a plurality of active materials existing in the machine are focused on in a case where a tumbling fluidized coating machine is used in S2, active materials onto which the complex solution is sprayed, and active materials whose complex solution on the surface is dried are mixed. Therefore, S2 may be referred to as a step of spraying the complex solution onto the active material and at the same time drying the complex solution attached onto the surface of the active material.

Here, hydrogen peroxide included in the complex solution has a strong oxidation action. Therefore, if the active material has contact with the complex solution for a long time, there is a possibility that the active material is eroded by hydrogen peroxide, and the eroded active material degrades. Therefore, in the present invention, in order to having a configuration in which the active material is difficult to degrade, the complex solution existing on the surface of the active material is dried immediately after attached onto the surface of the active material by the spraying. With such a configuration, it is possible to manufacture an active material composite powder with which the reaction resistance of a battery can be reduced.

In addition, by S2 in which the complex solution is sprayed onto the active material and at the same time the complex solution on the surface of the active material is dried to attach the precursor of lithium niobate onto the surface of the active material, it is possible to form lithium niobate on the surface of the active material, even though the temperature of the heating treatment at the heating treatment step carried out after S2 is decreased. The effect obtained by the decrease of the temperature of the heating treatment will be described later.

The heating treatment step (hereinafter it may be referred to as "S3") is a step of carrying out, after S2, a heating treatment on the active material of which the precursor of lithium niobate is attached onto the surface, at a temperature higher than 123° C. and lower than 350° C. By S3, it is possible to obtain an active material composite powder including an active material and lithium niobate attached onto the surface of the active material. The heating treatment of S3 may be carried out in the atmosphere.

In S3, the temperature of the heating treatment is made higher than 123° C. By having the heating treatment at a temperature like this, it is possible to reduce the remaining amount of impurities (volatile elements) such as the solvent of the complex solution, hydrated water, and the like. The hydrated water obstructs the lithium ion conduction. Therefore, by reducing this remaining amount, it is possible to reduce the reaction resistance. The active material composite powder manufactured by the method for manufacturing an active material composite powder of the present invention is used for all-solid-state batteries having sulfide solid electrolytes for example. Sulfide solid electrolytes deteriorate by a reaction with water, and as a result, they easily increase the reaction resistance of all-solid-state batteries. Therefore, by reducing the remaining amount of the solvent of the complex solution, it is possible to reduce the reaction resistance of batteries.

In S3, the temperature of the heating treatment is made lower than 350° C. Since S3 is carried out after S2, the precursor of the lithium niobate is attached onto the surface of the active material by S2 in which the complex solution is sprayed onto the active material and at the same time the complex solution on the surface of the active material is dried. By attaching the precursor of lithium niobate onto the surface of the active material by this S2, it is possible to form lithium niobate, even though the temperature of the heating treatment is lower than before. Here, if the temperature of the heating treatment is high, many gaps are easily formed in lithium niobate, and as a result, the BET specific surface area of the active material composite powder easily increases. These gaps which obstruct the lithium ion conduction contribute to an increased reaction resistance of a battery. In order to reduce the reaction resistance of a battery, it is effective to reduce the number of gaps in lithium niobate. In order to reduce the number, it is effective to make the temperature of the heating treatment low. By making the temperature of the heating treatment lower than 350° C., it is possible to reduce the number of gaps in lithium niobate. Thus it is possible to reduce the reaction resistance.

In addition, by making the temperature of the heating treatment no less than 350° C., crystallized lithium niobate is formed on the surface of the active material. The crystallized lithium niobate, which has a lower lithium ion conductivity than that of amorphous lithium niobate, contributes to an increased reaction resistance of a battery. In order to reduce the reaction resistance of a battery, it is effective not to crystallize lithium niobate. In order not to crystallize lithium niobate, it is effective to make the temperature of the heating treatment lower than a predetermined temperature. By making the temperature of the heating treatment lower than 350° C., it is possible to prevent crystallization of lithium niobate, therefore it is possible to reduce the reaction resistance of a battery.

As described above, by S3 after S2 in which the heating treatment is carried out at a temperature higher than 123° C. and lower than 350° C. to form lithium niobate onto the surface of the active material, it is possible to manufacture an active material composite powder with which the reaction resistance of a battery can be reduced. In addition, alkoxide solutions used in conventional techniques include a lot of carbon. Therefore a lot of gas is generated from the precursor of lithium niobate in the heating treatment, and as a result, lithium niobate having many gaps are easily formed. In contrast, according to the method for manufacturing an active material composite powder of the present invention using a solution including the peroxo complex of niobium (and the method for manufacturing a lithium battery of the present invention described later. Hereinafter the same is applied), it is possible to reduce the amount of gas produced from the precursor of lithium niobate in the heating treatment. As a result, it is possible to reduce the number of gaps in lithium niobate, therefore it is possible to reduce the reaction resistance. In addition, since the complex solution used in the method for manufacturing an active material composite powder of the present invention is cheaper than alkoxide solutions, it is also possible to reduce the manufacturing cost, in addition to the above effect.

By manufacturing an active material composite powder through S1 to S3, it is possible to manufacture an active material composite powder whose BET specific surface area is more than 0.93 $m^2/g$ and less than 1.44 $m^2/g$.

In the method for manufacturing an active material composite powder of the present invention, the temperature of the heating treatment of S3 is not particularly limited as long as it is higher than 123° C. and lower than 350° C. However, in view of having a configuration in which the reaction resistance of a battery is easily reduced by having a configuration in which the number of gaps in lithium niobate is easily reduced, a configuration in which crystallization of lithium niobate is easily prevented, and so on, the upper limit of the temperature of the heating treatment is preferably no more than 300° C. More preferably it is no more than 250° C.

In addition, in the method for manufacturing an active material composite powder of the present invention, the lower limit of the temperature of the heating treatment is preferably no less than 150° C., in view of having a configuration in which the reaction resistance of a battery is easily reduced by reducing the remaining amount of impurities such as the solvent of the complex solution, hydrated water, and the like.

4. Method for Manufacturing a Lithium Battery

Figure 5:
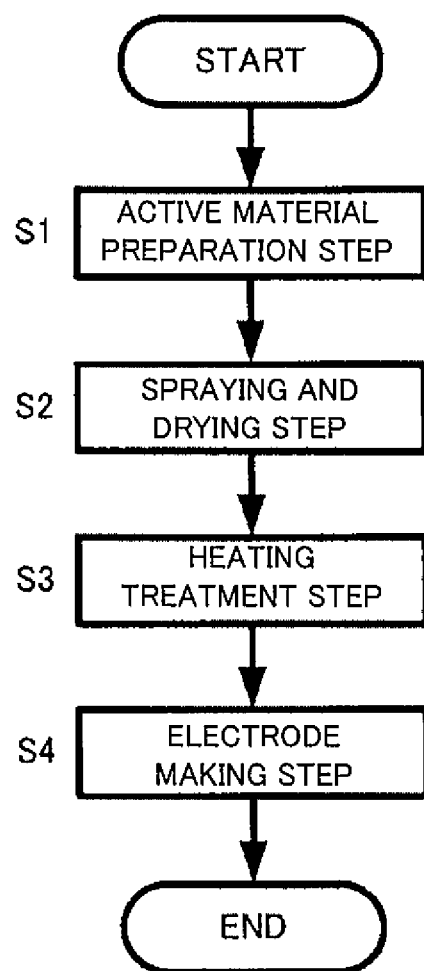
FIG. 5 is a flowchart to explain a method for manufacturing a lithium battery of the present invention.

FIG. 5 is a flowchart to explain a method for manufacturing a lithium battery of the present invention. In FIG. 5, to the same steps as the steps shown in FIG. 3 to explain the method for manufacturing an active material composite powder of the present invention, same signs as that in FIG. 3 are used, and explanations thereof are adequately omitted.

The method for manufacturing a lithium battery of the present invention shown in FIG. 5 includes an active material preparation step (S1), a spraying and drying step (S2), a heating treatment step (S3), and an electrode making step (S4). The descriptions of S1 to S3 will be omitted here since they are already explained in "3. Method for manufacturing an active material composite powder of the present invention".

The electrode making step (hereinafter it may be referred to as "S4") is a step of manufacturing a cathode or an anode both including the active material composite powder manufactured in S1 to S3. For example, in a case where the lithium battery 20 shown in FIG. 2 is manufactured, S4 is a step of manufacturing the cathode 21 including the active material composite powder 10. The way of S4 is not particularly limited as long as the S4 is a step of manufacturing a cathode or an anode both including the active material composite powder of the present invention. For example, in a case where the cathode 21 is manufactured in S4, S4 may be a step of manufacturing the cathode 21 through processes of: adding the active material composite powder 10, the sulfide solid electrolyte 23a, the conductive assistant 21a, and the binder 21b, in a solvent; thereafter dispersing the resultant material by means of an ultrasonic homogenizer and the like, to make a cathode composition in a slurry form; applying the cathode composition onto the surface of the cathode current collector 24; and thereafter drying it.

After one electrode (cathode or anode) including the active material composite powder of the present invention is made by S4, the other electrode (anode or cathode) is made. The electrolyte is to be sandwiched by these electrodes. After one pair of electrodes (cathode and anode) is made, the lithium battery of the present invention can be manufactured, through a process of arranging the electrolyte between the cathode and the anode.

EXAMPLES

Sample Making

Example 1

(1) Preparation of Active Material
Prepared was a cathode active material $LiNi_{1/3}Mn_{1/3}CO_{1/3}O_2$ (manufactured by NICHIA CORPORATION) of which lithium niobate was to be attached onto the surface.
(2) Preparation of Complex Solution
To a container in which 870.4 g of hydrogen peroxide water of 30 mass % in concentration was, 987.4 g of ion-exchange water and 44.2 g of niobium acid ($Nb_2O_5.3H_2O$ (water containing ratio of $Nb_2O_5$:72%)) were added. Next, to the container, 87.9 g of ammonia water of 28 mass % in concentration was added. After the ammonia water was added, the contents of the container were sufficiently stirred, to obtain a transparent solution. Further, to the obtained transparent solution, 10.1 g of lithium hydroxide.1hydrate ($LiOH.H_2O$) was added to obtain a complex solution including lithium and the peroxo complex of niobium. The mol concentrations of Li and Nb in the obtained complex solution were both 0.12 mol/kg.
(3) Spraying and Drying
The complex solution in an amount of 2000 g obtained by the above procedure was sprayed onto 1000 g of cathode active material $LiNi_{1/3}Mn_{1/3}CO_{1/3}O_2$, and at the same time, the complex solution was dried, by means of a tumbling fluidized coating machine (MP-01, manufactured by POWREX CORPORATION). Thereby, the surface of the cathode active material was coated by a layer including the precursor of lithium niobate. The operation conditions of the tumbling fluidized coating machine were, intake gas: nitrogen; intake gas temperature: 120° C.; intake gas amount: 0.4 m³/h; revolution speed of rotor: 400 per minute; and spray speed: 4.5 g/min.
(4) Heating Treatment
The powder including the cathode active material and the layer including the precursor of lithium niobate formed on the surface of the cathode active material obtained by the spraying and drying were subjected to the heating treatment, under the conditions of 150° C. for 5 hours in the atmosphere. Whereby, an active material composite powder having $LiNi_{1/3}Mn_{1/3}Co_{1/3}O_2$ and lithium niobate attached onto the surface of the $LiNi_{1/3}Mn_{1/3}CO_{1/3}O_2$ (active material composite powder of Example 1) was obtained.

(5) Manufacturing of all-Solid-State Battery
The obtained active material composite powder of Example 1 and a sulfide-based solid electrolyte ($Li_3PS_4$) were weighed so that the active material composite powder: the sulfide-based solid electrolyte=6:4 by volume ratio, and put in a container in which heptanes was. Further, a conductive assistant (vapor-grown carbon fiber, manufactured by SHOWA DENKO K. K.) to be in an amount of 3 mass %, and a binder (butylene rubber, manufactured by JSR Corporation) to be in an amount of 3 mass % were put in the container in which heptanes and the like were. Whereby, a cathode slurry was made. Next, the cathode slurry was dispersed by an ultrasonic homogenizer (UH-50, manufactured by MST Corporation, the same is applied hereinafter) to obtain a cathode composition. The obtained cathode composition was applied onto the upper surface of an aluminum foil, and continuously dried at 100° C. for 30 minutes. Whereby, a cathode was formed on the upper surface of the aluminum foil. Next, the aluminum foil of which the cathode was formed on the upper surface was punched in 1 cm² in size, whereby a cathode electrode was obtained.

On the other hand, an anode active material (layered carbon) and a sulfide-based solid electrolyte ($Li_3PS_4$) were weighed so that the anode active material:the sulfide-based solid electrolyte=6:4 by volume ratio, and put in a container in which heptane was. Further, a binder (butylene rubber, manufactured by JSR Corporation) to be in an amount of 1.2 mass % was put in the container in which heptane, the anode active material and the like were. Whereby, an anode slurry was made. Next, the made anode slurry was dispersed by an ultrasonic homogenizer, to obtain an anode composition. The obtained anode composition was applied onto the upper surface of a copper foil, and continuously dried at 100° C. for 30 minutes. Whereby, an anode was formed on the upper surface of the copper foil. Next, the copper foil of which the anode is formed on the upper surface was punched in 1 cm² in size, whereby an anode electrode was obtained.

Next, a sulfide-based solid electrolyte ($Li_3PS_4$) in an amount of 64.8 mg was put in a tubular ceramics whose cross-sectional area of internal circle was 1 cm², and pressed at 98 MPa after the surface was smoothed. Whereby, a separator layer was formed. Thereafter, the cathode electrode and the anode electrode were put in the tubular ceramics so that the separator layer was arranged therebetween, and pressed at 421.4 MPa. After that, a stainless stick was put in each of the cathode electrode side and the anode electrode side, and held at 98 MPa, whereby an all-solid-state battery of Example 1 was made.

Example 2

An active material composite powder having $LiNi_{1/3}Mi_{1/3}CO_{1/3}O_2$ and lithium niobate attached onto the surface of the $LiNi_{1/3}Mi_{1/3}CO_{1/3}O_2$ (active material composite powder of Example 2) was made under the same conditions as in Example 1, except that the temperature of the heating treatment for obtaining the active material composite powder was changed to 200° C. Further, an all-solid-state battery (all-solid-state battery of Example 2) was made under the same conditions as in Example 1, except that the active material composite powder of Example 2 was used instead of the active material composite powder of Example 1.

Example 3

An active material composite powder having $LiNi_{1/3}Mi_{1/3}CO_{1/3}O_2$ and lithium niobate attached onto the surface of the LiNi$_{1/3}$Mi$_{1/3}$Co$_{1/3}$O$_2$ (active material composite powder of Example 3) was made under the same conditions as in Example 1, except that the temperature of the heating treatment for obtaining the active material composite powder was changed to 250° C. Further, an all-solid-state battery (all-solid-state battery of Example 3) was made under the same conditions as in Example 1, except that the active material composite powder of Example 3 was used instead of the active material composite powder of Example 1.

Example 4

An active material composite powder having LiNi$_{1/3}$Mi$_{1/3}$CO$_{1/3}$O$_2$ and lithium niobate attached onto the surface of the LiNi$_{1/3}$Mi$_{1/3}$CO$_{1/3}$O$_2$ (active material composite powder of Example 4) was made under the same conditions as in Example 1, except that the temperature of the heating treatment for obtaining the active material composite powder was changed to 300° C. Further, an all-solid-state battery (all-solid-state battery of Example 4) was made under the same conditions as in Example 1, except that the active material composite powder of Example 4 was used instead of the active material composite powder of Example 1.

Comparative Example 1

An active material composite powder having LiNi$_{1/3}$Mi$_{1/3}$CO$_{1/3}$O$_2$ and lithium niobate attached onto the surface of the LiNi$_{1/3}$Mi$_{1/3}$CO$_{1/3}$O$_2$ (active material composite powder of Comparative Example 1) was made under the same conditions as in Example 1, except that the temperature of the heating treatment for obtaining the active material composite powder was changed to 100° C. Further, an all-solid-state battery (all-solid-state battery of Comparative Example 1) was made under the same conditions as in Example 1, except that the active material composite powder of Comparative Example 1 was used instead of the active material composite powder of Example 1.

Comparative Example 2

An active material composite powder having LiNi$_{1/3}$Mi$_{1/3}$CO$_{1/3}$O$_2$ and lithium niobate attached onto the surface of the LiNi$_{1/3}$Mi$_{1/3}$Co$_{1/3}$O$_2$ (active material composite powder of Comparative Example 2) was made under the same conditions as in Examples 1, except that the temperature of the heating treatment for obtaining the active material composite powder was changed to 350° C. Further, an all-solid-state battery (all-solid-state battery of Comparative Example 2) was made under the same conditions as in Example 1, except that the active material composite powder of Comparative Example 2 was used instead of the active material composite powder of Example 1.

Comparative Example 3

(1) Preparation of Active Material

Prepared was a cathode active material LiNi$_{1/3}$Mn$_{1/3}$CO$_{1/3}$O$_2$ (Manufactured by NICHIA CORPORATION) of which lithium niobate is to be attached onto the surface.

(2) Preparation of Alkoxide Solution

An alkoxide solution was made with ethoxylithium, pentaethoxyniobium, and dehydrated ethanol. Ethoxylithium was put in a container in which dehydrated ethanol was, to be dissolved, and uniformly dispersed in the dehydrated ethanol. Thereafter pentaethoxyniobium was put in the container in which the ethoxylithium and dehydrated ethanol were, so that the element ratio (mol ratio) of the lithium and niobium was 1:1. Thereafter the contents of the container were stirred until the penthaethoxyniobium was uniformly mixed. Whereby, an alkoxide solution was obtained. The putting amount of the ethoxylithium was adjusted so that the ratio of the solid content of the alkoxide solution was 6.9 mass %.

(3) Spraying and Drying

The alkoxide solution in an amount of 680 g obtained by the above procedures was sprayed onto 1000 g of cathode active material LiNi$_{1/3}$Mn$_{1/3}$CO$_{1/3}$O$_2$, and at the same time the alkoxide solution was dried, by means of a tumbling fluidized coating machine (MP-01, manufactured by POWREX CORPORATION). Whereby, the surface of the cathode active material was coated by a layer including the precursor of lithium niobate. Here, the operation conditions of the tumbling fluidized coating machine were, intake gas: nitrogen; intake gas temperature: 80° C.; intake gas amount: 0.3 m$^3$/h; revolution speed of rotor: 300 per minute; and spray speed: 1.5 g/min. The difference in the operation conditions of the tumbling fluidized coating machine between Example 1 and Comparative Example 3 originates from the difference in the solutions used therein.

(4) Heating Treatment

The powder having the cathode active material and the layer including the precursor of lithium niobate formed on the surface of the cathode active material, obtained by the spraying and drying with the alkoxide solution, was subjected to the heating treatment under the conditions of 350° C. for 5 hours in the atmosphere. Whereby, an active material composite powder having LiNi$_{1/3}$Mn$_{1/3}$CO$_{1/3}$O$_2$ and lithium niobate attached onto the surface of the LiNi$_{1/3}$Mn$_{1/3}$CO$_{1/3}$O$_2$ (active material composite powder of Comparative Example 3) was obtained.

(5) Manufacture of all-Solid-State Battery

An all-solid-state battery (all-solid-state battery of Comparative Example 3) was made under the same conditions of Example 1, except that the active material composite powder of Comparative Example 3 was used instead of the active material composite powder of Example 1.

In Comparative Example 3, ethoxylithium was used as a lithium source. However, another lithium source can be used as long as an alkoxide solution for forming lithium niobate can be prepared. Examples of such a lithium source include lithium acetate, alkoxide of lithium, lithium hydroxide, and the like. In Comparative Example 3, pentaethoxyniobium was used as a niobium source. However, another niobium source can be used as long as an alkoxide solution for forming lithium niobate can be prepared. Examples of such a niobium source include pentamethoxyniobium, penta-i-propoxyniobium, penta-n-propoxyniobium, penta-i-butoxyniobium, penta-n-butoxyniobium, penta-sec-butoxyniobium, and the like. In Comparative Example 3, ethanol was used. However, an alkoxide solution for forming lithium niobate can be prepared even though methanol, propanol, butanole, or the like is used instead of ethanol. In Comparative Example 3, the surface of the cathode active material was coated by a layer including a niobium compound and a lithium compound, by means of a tumbling fluidized coating machine. However, in a case where an alkoxide solution is used, it is also possible to coat the surface of the cathode active material by a layer including a niobium compound and a lithium compound, by immersing the active material in an alkoxide solution thereafter drying the solvent, or by using a spray dryer.

Comparative Example 4

An active material composite powder having LiNi$_{1/3}$Mn$_{1/3}$CO$_{1/3}$O$_2$ and lithium niobate attached onto the LiNi$_{1/3}$Mn$_{1/3}$CO$_{1/3}$O$_2$ (active material composite powder of Comparative Example 4) was made under the same conditions as in Comparative Example 3, except that the powder was exposed in the atmosphere after the spraying and drying for 24 hours, to progress the hydrolysis of the precursor, thereafter the heating treatment was carried out under the conditions of 350° C. for 5 hours in the atmosphere. Further, an all-solid-state battery (all-solid-state battery of Comparative Example 4) was made under the same conditions as in Example 1, except that the active material composite powder of Comparative Example 4 was used instead of the active material composite powder of Example 1.

Comparative Example 5

Prepared were 20 g of the complex solution prepared by the same method as in Example 1, and 10 g of cathode active material LiNi$_{1/3}$Mn$_{1/3}$Co$_{1/3}$O$_2$. They were mixed, whereby a mixture was obtained.

The obtained mixture was heated to 100° C., to evaporate water until powders can be taken out therefrom. Thereafter the heating treatment was carried out under the conditions of 300° C. for 5 hours in the atmosphere, whereby an active material composite powder having LiNi$_{1/3}$Mn$_{1/3}$CO$_{1/3}$O$_2$ and lithium niobate attached onto the surface of the LiNi$_{1/3}$Mn$_{1/3}$Co$_{1/3}$O$_2$ (active material composite powder of Comparative Example 5) was obtained. Further, an all-solid-state battery (all-solid-state battery of Comparative Example 5) was made under the same conditions as in Example 1, except that the active material composite powder of Comparative Example 5 was used instead of the active material composite powder of Example 1.

[Measurement of Reaction Resistance of All-Solid-State Battery]

Figure 6:
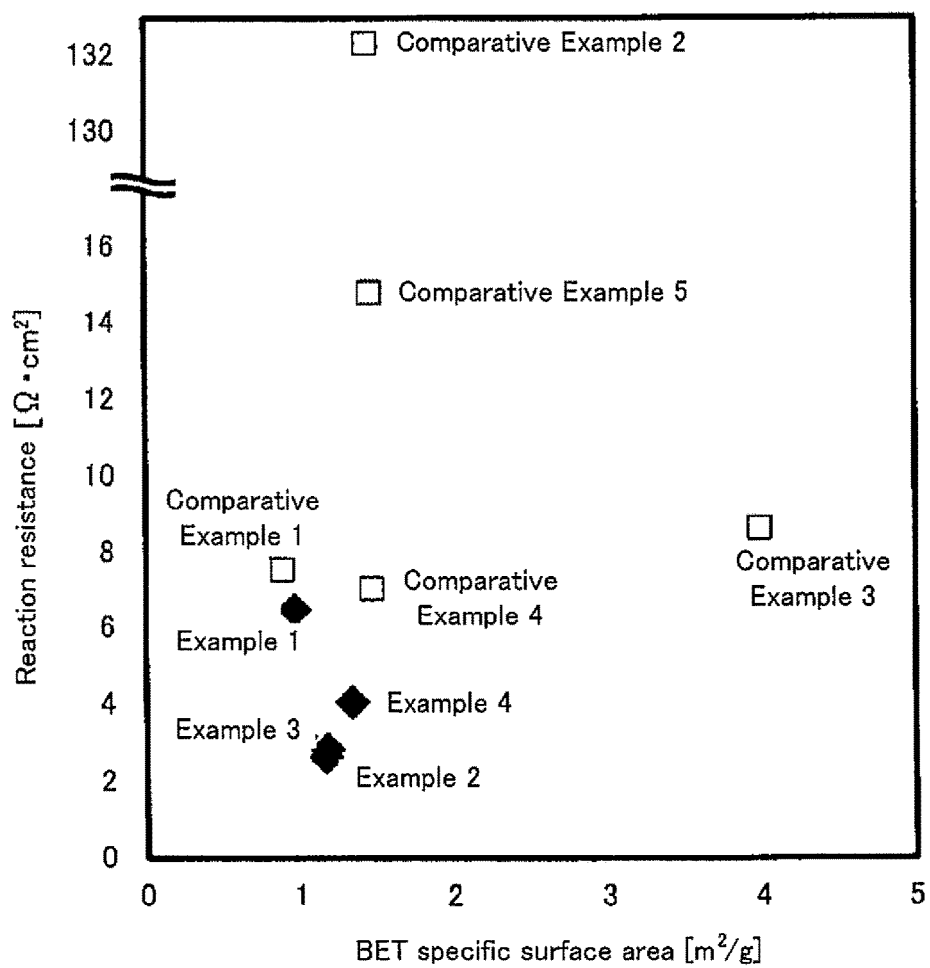
FIG. 6 is a graph to explain the relationship between the reaction resistance and the BET specific surface area.
Figure 7:
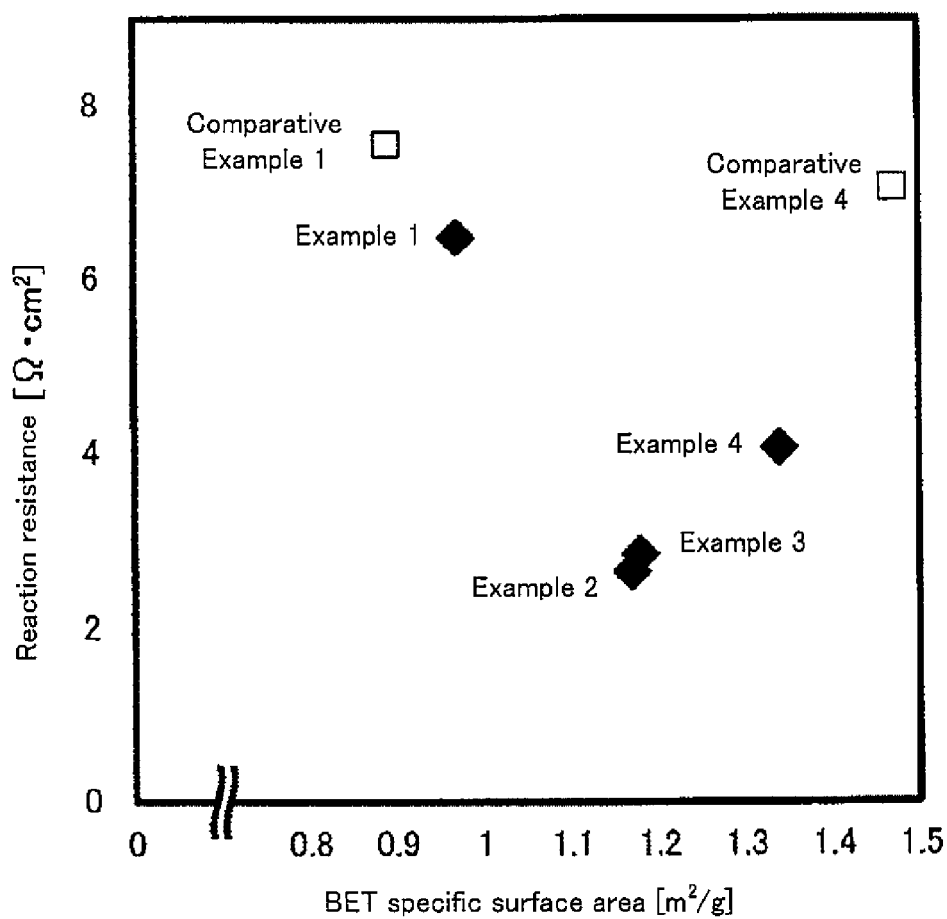
FIG. 7 is an enlarged view of a part of FIG. 6.
Figure 8:
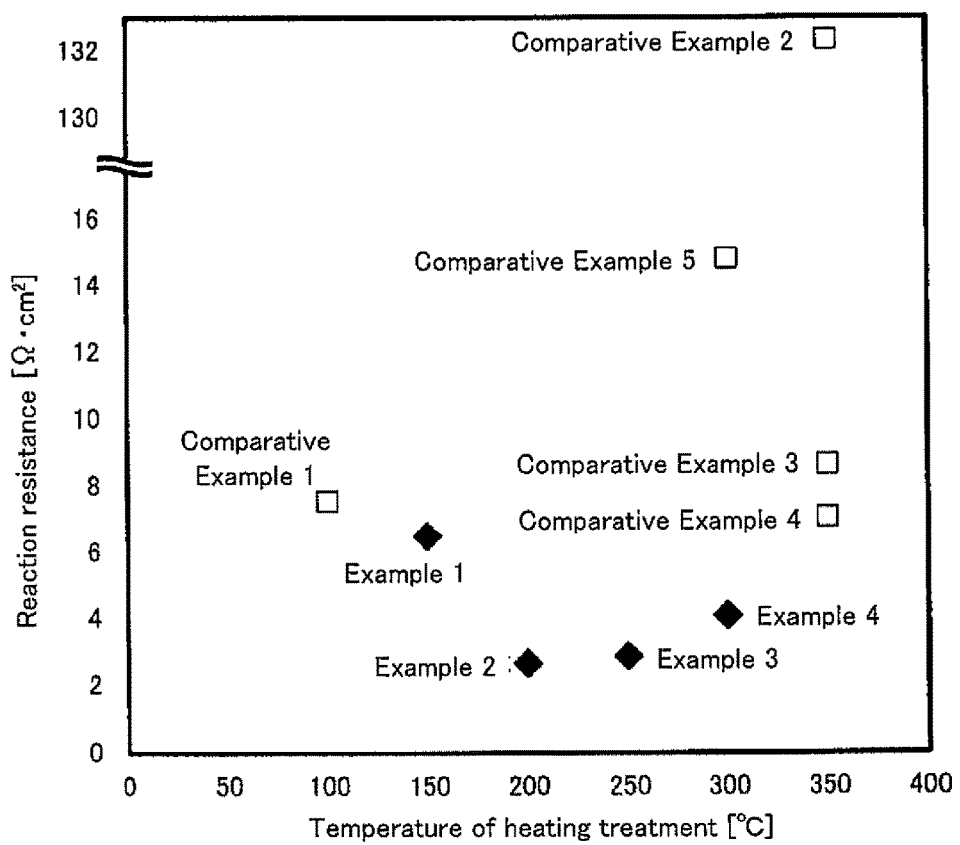
FIG. 8 is a graph to explain the relationship between the reaction resistance and the temperature of a heating treatment.

Each of the all-solid-state batteries of Example 1 to Example 4 and Comparative Example 1 to Comparative Example 5 manufactured by the above methods was charged to 4.5 V in voltage, thereafter discharged to 2.5 V. After that, an AC impedance measurement was carried out at 3.6 V. From the arc obtained by a Nyquist plot, the reaction resistance [Ω·cm$^2$] of each all-solid-state batter was identified. Values of the reaction resistances obtained by a rounding off to the two decimal places are shown in Table 2. The relationship between the reaction resistance and the BET specific surface area is shown in FIGS. 6 and 7, and the relationship between the reaction resistance and the temperature of the heating treatment is shown in FIG. 8. FIG. 7 is a view extracting and showing only the results of samples whose reaction resistances were each no more than 8 Ω·cm$^2$ from FIG. 6. In FIGS. 6 and 7, the reaction resistance [Ω·cm$^2$] is taken along the horizontal axis, and the BET specific surface are [m$^2$/g] is taken along the vertical axis. In FIG. 8, the reaction resistance [Ω·cm$^2$] is s taken along the horizontal axis, and the temperature of the heating treatment [° C.] is taken along the horizontal axis. It is noted that, the reaction resistance (value obtained by a rounding off to the two decimal places) of an all-solid-state battery manufactured by the same method as in Example 1, except that an active material LiNi$_{1/3}$Mn$_{1/3}$CO$_{1/3}$O$_2$ of which lithium niobate was not attached onto the surface was used instead of the active material composite powder of Example 1, was 843.59 Ω·cm$^2$.

TABLE 2

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Reaction resistance [Ω · cm$^2$] | 6.48 | 2.64 | 2.84 | 4.06 | 7.56 | 132.34 | 8.64 | 7.06 | 14.81 |

[Identification of BET Specific Surface Area]

The BET specific surface area of each of the active material composite powders of Example 1 to Example 4 and Comparative Example 1 to Comparative Example 5 manufactured by the above method was measured by a specific surface area measuring device (Trista 3000, manufactured by Shimadzu Corporation). Values of the specific surface areas obtained by a rounding off to the two decimal places are shown in Table 1. It is noted that the BET specific surface area of an active material LiNi$_{1/3}$Mn$_{1/3}$CO$_{1/3}$O$_2$ of which lithium niobate was not attached onto the surface was 1.1 m$^2$/g.

As shown in Tables 1 and 2, and FIGS. 6 and 7, it was possible to make the reaction resistance of the battery small by making a BET specific surface area S 0.93 m$^2$/g<S<1.44 m$^2$/g. Here, the BET specific surface area when the reaction resistance on a straight line connecting the result of Comparative Example 1 and the result of Example 1 shown in FIG. 7 was made same as that of Comparative Example 4 is 0.93 m$^2$/g. This 0.93 m$^2$/g is a value obtained by a rounding off to the two decimal places.

In addition, it was found that, it gets easy to reduce the reaction resistance of the battery by making the BET specific surface area S 0.97 m$^2$/g≤S≤1.44 m$^2$/g, and it gets easy to

TABLE 1

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| BET specific surface area [m$^2$/g] | 0.97 | 1.17 | 1.18 | 1.34 | 0.89 | 1.44 | 3.99 | 1.47 | 1.46 | further reduce the reaction resistance of the battery by making the BET specific surface area S $0.97\ m^2/g \leq S \leq 1.34\ m^2/g$, as shown in Tables 1 and 2, and FIGS. 6 and 7.

In addition, as shown in Table 2 and FIG. 8, it was possible to make the reaction resistance of the battery small by making the temperature of the heating treatment Kiger than 123° C. and lower than 350° C. Here, when a straight line connecting the result of Comparative Example 1 and the result of Example 1 shown in FIG. 8 is made, the temperature of the heating treatment obtained by making the reaction resistance on the straight line same as that of Comparative Example 4 is 123° C.

In addition, in Comparative Example 5, in which the mixture of the complex solution and the cathode active material was heated to 100° C. to evaporate water and thereafter subjected to the heating treatment under the conditions of 300° C. for 5 hours in the atmosphere, the battery had a large reaction resistance, even though the temperature of the heating treatment was within this range. It is considered that this is because the cathode active material deteriorated by the erosion thereof by hydrogen peroxide included in the complex solution.

In addition, as shown in Table 2 and FIG. 8, it was found that it gets easy to reduce the reaction resistance of the battery by making the temperature of the heating treatment no more than 300° C., and it gets easy to further reduce the reaction resistance of the battery by making the temperature of the heating treatment no more than 250° C. Further, it was found that it gets easy to reduce the reaction resistance of the battery by making the temperature of the heating treatment no less than 150° C.

[Mass Ratio Before and after Additional Heating Treatment]

Figure 9:
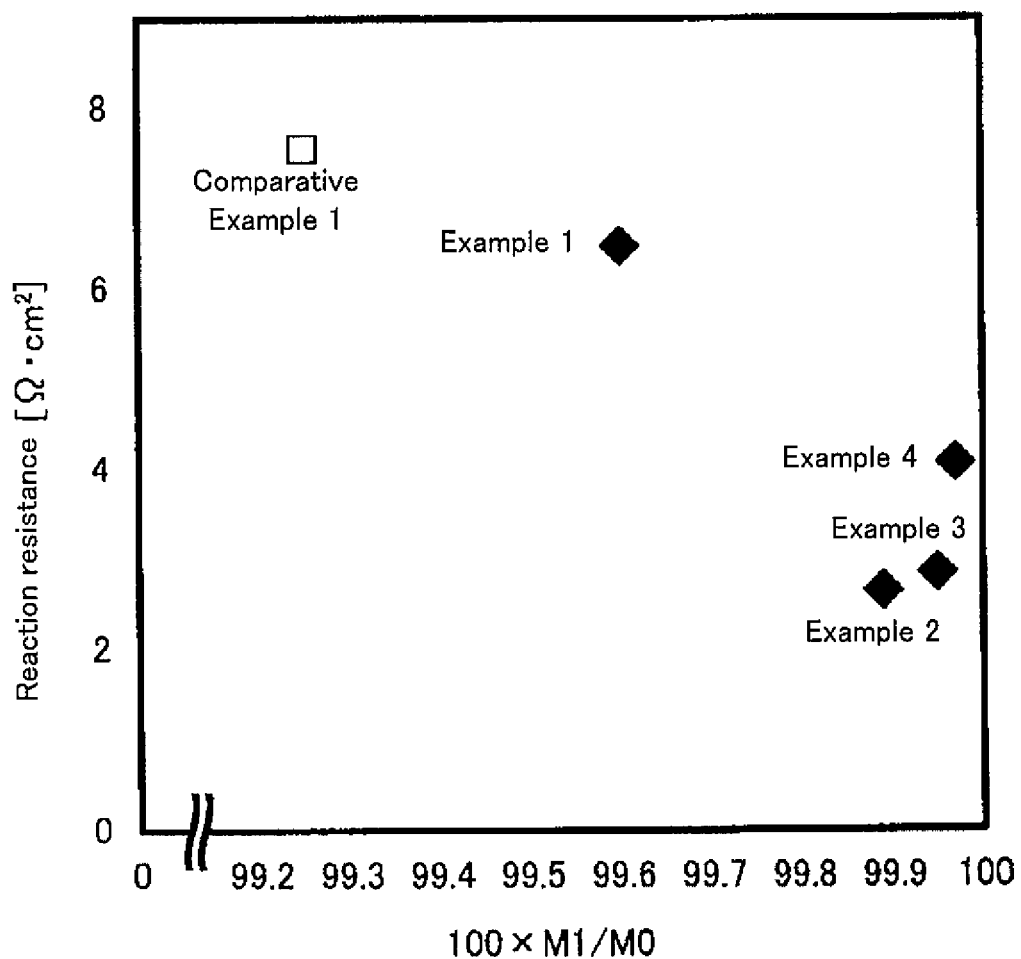
FIG. 9 is a graph to explain the relationship between the reaction resistance and the mass ratio before and after an additional heating treatment.

As shown in FIGS. 6 to 8, Example 1 whose temperature of the heating treatment was 150° C. and Comparative Example 1 whose temperature of the heating treatment was 100° C. had larger reaction resistances than those of Examples 2 to 4 whose temperatures of the heating treatment were no less than 200° C. and no more than 300° C. In order to identify the cause of this, each active material composite powder of Examples 1 to 4 and Comparative Example 1 was subjected to a heating treatment at 350° C. for 10 minutes in the atmosphere (additional heating treatment). FIG. 9 shows the relationship between the mass ratio 100×M1/M0 and the reaction resistance of each all-solid-state battery of Examples 1 to 4 and Comparative Example 1 manufactured with the active material composite powder before the additional heating treatment was carried out, wherein M0 was the mass of the active material composite powder before the additional heating treatment was carried out and M1 was the mass of the active material composite powder after the additional heating treatment was carried out. The values of the mass ratio 100×M1/M0 (values obtained by a rounding off to the two decimal places) are shown in Table 3.

TABLE 3

|  | Example 1 | Example 2 | Example 3 | Example 4 | Comparative Example 1 |
|---|---|---|---|---|---|
| 100 × M1/M0 | 99.60 | 99.89 | 99.95 | 99.97 | 99.25 |

As shown in FIG. 8 and Table 3, Example 1 and Comparative Example 1, whose temperatures of the heating treatment were lower than those of Examples 2 to 4, had smaller values of the mass ratio 100×M1/M0, compared to those of the active material composite powders of Examples 2 to 4. It is considered that the reason of the smaller values of the mass ratio 100×M1/M0 of Example 1 and Comparative Example 1 was that, the active material composite powders of Example 1 and Comparative Example 1 had impurities such as the solvent of the complex solution and hydrated water more than the active material composite powders of Examples 2 to 4, and the impurities were volatilized due to the additional heating treatment. From the above results, it was found that it gets easy to reduce the reaction resistance of the battery with the mass ratio M1/M0 of 99.60<100×M1/M0, and it gets easy to further reduce the reaction resistance of the battery with the mass ratio M1/M0 of 99.89≤100×M1/M0.

The reason of the smaller BET specific surface areas of the active material composite powders of Example 1 and Comparative Example 1 in which lithium niobate was attached onto the surface of the active materials than the BET specific surface areas of the powders in which lithium niobate was not attached onto the surface of the active material can be considered as follows. That is, it can be considered that: the active material used this time, onto which lithium niobate was to be attached, had a form of a secondary particle in which primary particles were gathered; the surface of the secondary particle got smooth by the attachment of lithium niobate thereon, and as a result, the active material composite powders of Example 1 and Comparative Example 1 had smaller BET specific surface areas than that of the powder in which lithium niobate was not attached onto the surface of the active material. In contrast, the reason why the BET specific surface areas of the active materials of Examples 2 to 4 were larger than that of the powder in which lithium niobate was not attached onto the surface of the active material can be considered as follows. That is, it can be considered that: in Examples 2 to 4 whose temperatures of the heating treatment were higher than those of Example 1 and Comparative Example 1, impurities such as the solvent of the complex solution and hydrated water were easily volatilized in the heating treatment, and when they were volatilized, concavities and convexities were formed on the layer of lithium niobate; as a result, the active material composite powders of Examples 2 to 4 had larger BET specific surface areas than that of the powder in which lithium niobate was not attached onto the surface of the active material. It is noted that, in Examples of the present invention (Examples 1 to 4), in which a complex solution including the peroxo complex of niobium was used, gaps were difficult to be formed in the layer of lithium niobate, compared to Comparative Example 3 in which an alkoxide solution was used. Therefore, the active material composite powders of Examples 2 to 4 had smaller values of the BET specific surface area than that of the active material composite powder of Comparative Example 3. The active material composite powder of Comparative Example 4 had a smaller BET specific surface area than that of the active material composite particle of Comparative Example 3, because the hydrolysis of the precursor was progressed before the heating treatment, to make it difficult to produce gases in the heating treatment.

In addition, as described above, the BET specific surface area of the cathode active material $LiNi_{1/3}Mn_{1/3}CO_{1/3}O_2$ used this time was $1.1\ m^2/g$. Therefore, the conditions of the BET specific surface area that the active material composite powder of the present invention shall satisfy, and the conditions of the BET specific surface area that the active material composite powder of the present invention preferably satisfies can also be represented as follows, based on the BET specific surface area S0 of the active material before lithium niobate is attached. That is, the BET specific surface area S of the active material composite powder of the present invention shall be S0−0.17<S<S0+0.34. Further, the BET specific surface area S of the active material composite powder of the present invention is preferably S0−0.13<S. In addition, the BET specific surface area S of the active material composite powder of the present invention is preferably S≤S0+0.24. The method for attaching lithium niobate onto the surface does not change even though the active material of which lithium niobate is to be attached on the surface changes. Therefore, it can be considered that it is possible to reduce the reaction resistance of the battery, by satisfying the above conditions of the BET specific surface area represented with S0, even though the active material to be used is changed.

REFERENCE SIGNS LIST

1 active material
2 lithium niobate
10 active material composite powder
20 lithium battery
21 cathode
21a conductive assistant
21b, 22b binder
22 anode
22a anode active material
23 solid electrolyte layer (electrolyte)
23a sulfide solid electrolyte

The invention claimed is:

1. A method for manufacturing an active material composite powder comprising:
   a spraying and drying step of spraying a solution including hydrogen peroxide, lithium and a peroxo complex of niobium onto an active material and at the same time drying the solution; and
   a heating treatment step of carrying out a heating treatment after the spraying and drying step,
   wherein the temperature of the heating treatment is higher than 123° C. and no more than 250° C., and
   a BET specific surface area S [$m^2/g$] of the active material composite powder is more than 0.93 and less than 1.44.

2. A method for manufacturing a lithium battery including a cathode, an anode, and an electrolyte having contact with the cathode and the anode, the method comprising:
   a spraying and drying step of spraying a solution including hydrogen peroxide lithium and a peroxo complex of niobium onto an active material and at the same time drying the solution;
   a heating treatment step of carrying out a heating treatment at a temperature higher than 123° C. and no more than 250° C., to make an active material composite powder after the spraying and drying; and
   an electrode making step of making the cathode or the anode including the active material composite powder,
   wherein a BET specific surface area S [$m^2/g$] of the active material composite powder is more than 0.93 and less than 1.44.

* * * * *